US006885656B2

(12) United States Patent
Sashihara

(10) Patent No.: US 6,885,656 B2
(45) Date of Patent: Apr. 26, 2005

(54) ASYNCHRONOUS INTERFERENCE AVOIDING METHOD AND ASYNCHRONOUS INTERFERENCE AVOIDING SYSTEM

(75) Inventor: Toshiyuki Sashihara, Tokyo (JP)

(73) Assignee: NEC Corporation, Tokyo (JP)

( * ) Notice: Subject to any disclaimer, the term of this patent is extended or adjusted under 35 U.S.C. 154(b) by 861 days.

(21) Appl. No.: 09/879,989

(22) Filed: Jun. 14, 2001

(65) Prior Publication Data

US 2002/0031100 A1 Mar. 14, 2002

(30) Foreign Application Priority Data

Jun. 15, 2000 (JP) ........................................ 2000-180213

(51) Int. Cl.[7] .................................................. H04J 3/06
(52) U.S. Cl. .................... 370/350; 455/432.1; 455/63.1
(58) Field of Search ................................ 370/310, 331, 370/304, 329, 324, 350; 455/432.1, 436, 439, 442, 63.1

(56) References Cited

U.S. PATENT DOCUMENTS 5,475,869 A * 12/1995 Gomi et al. ................ 455/63.1
5,678,181 A * 10/1997 Kamachi .................... 455/63.1

FOREIGN PATENT DOCUMENTS

GB          2 302 481 A   *  1/1997

* cited by examiner

Primary Examiner—Wellington Chin
Assistant Examiner—Brenda Pham
(74) Attorney, Agent, or Firm—McGinn & Gibb, PLLC

(57) ABSTRACT

In a network that roughly comprises a temporary master station and a plurality of slave stations and is an adhoc network, which can be immediately constructed in situ, and is a temporary master station interposition-type network in which a temporary master station is present, the temporary master station receives and judges an interference detection packet sent from the slave station. By virtue of this construction, an asynchronous interference avoiding method and an asynchronous interference avoiding system can be realized which can reliably avoid interference.

20 Claims, 13 Drawing Sheets

ASYNCHRONOUS INTERFERENCE AVOIDING METHOD AND ASYNCHRONOUS INTERFERENCE AVOIDING SYSTEM

FIELD OF THE INVENTION

The invention relates to an asynchronous interference avoiding method and an asynchronous interference avoiding system which can avoid the interference of radio waves between a master station and a slave station.

BACKGROUND OF THE INVENTION

A conventional asynchronous interference avoiding system is proposed in Japanese Patent Laid-Open No. 67169/1995.

FIG. 1 is a block diagram showing an example of the conventional asynchronous interference avoiding system. As shown in FIG. 1, this conventional system comprises: a radio channel control unit 1; radio connection devices 2, 3, 4, 5; and mobile units 6, 7, 8, 9.

The radio channel control unit 1 performs the control of exchange between a general public network or other mobile communication system and a radio channel within a system, a mobile management for the mobile units 6, 7, 8, 9, and radio management for the system. The radio connection devices 2, 3, 4, 5 perform setting/release regarding the radio channel with respect to the mobile units 6, 7, 8, 9 under the control of the radio channel control unit 1 and, at the same time, monitor the radio channel. The mobile units 6, 7, 8, 9 perform communication through the radio connection devices 2, 3, 4, 5 and the radio channel control unit 1 while moving within the system.

Setting of the radio zones 10A, 10B, 10C, 10D are carried out respectively with respect to the radio connection devices 2, 3, 4, 5.

FIG. 2 is a block diagram showing the construction of the radio connection devices 2, 3, 4, 5 shown in FIG. 1.

The radio connection devices 2, 3, 4, 5 each comprise an antenna 101X, a radio section 102, a modem 103, a frame generator/deassembler 104, a control channel control unit 105, a communication channel control unit 106, an asynchronous interference detector 107, an interface section 108, and a slot synchronizer 109.

FIG. 3 is a diagram showing the flow of the operation in the radio channel control unit 1 shown in FIG. 1. Here the operation of the radio channel control unit 1 will be explained by taking the mobile unit 6 and the radio connection device 2 as an example. It is assumed that the mobile unit 6 is in communication with the radio connection device 2 through a slot 2S with a frequency f1. A spare channel slot (in this case, a slot 4S), which is not usually used, is provided in the radio connection device 2. This spare channel slot is used to search for an idle carrier. Information about this idle carrier is loaded onto the slot 2S under communication and is informed as a notification of idle carrier information to the mobile unit 6 (in this case, frequency f2, slot 4S). As soon as the idle carrier has become unusable, search for a new idle channel is performed, followed by updating and notification.

During this period, the radio connection device 2 measures the receive level of a plurality of points in the slot 2S under communication in the asynchronous interference detector 107, and reports the results to the communication channel control unit 106. Based on the results of the measurement, the communication channel control unit 106 performs the detection of asynchronous interference. If the asynchronous interference has been detected, then switches the channel to the communication channel (frequency f2, slot 4S) which has previously been notified as idle carrier information. The mobile unit 6 detects that the communication signal, which could have been received up to this time, cannot be received, followed by switching of the channel to the previously notified communication channel (frequency f2, slot 4S). In this connection, it should be noted that, likewise, the asynchronous interference detector 107 is provided on the mobile unit 6 side and operated. In the drawing, slots 1S and 3S are shown, and the explanation of other elements is omitted.

Japanese Patent No. 2553286 discloses an asynchronous interference avoiding method which can effectively and exactly detect particularly interference caused by asynchronous interference waves from the rear of the burst frame in a desired signal wave in time sharing digital mobile radio communication and can efficiently start the interference avoiding operation.

The prior art techniques, however, had the following problems.

When the conventional asynchronous interference avoiding system is used to cope with the asynchronous interference among the radio connection devices 2, 3, 4, 5, an asynchronous interference detector is provided on terminal side, that is, the mobile units 6, 7, 8, 9. In this construction, the terminal side detects interference by means of the asynchronous interference detector, and the channel is hopped to a previously notified communication channel. On the other hand, the radio connection devices 2, 3, 4, 5 detect asynchronous interference, based on the fact that a signal from the terminal side is not received, and perform channel hopping. When the terminal side is operated by a battery, however, the unreceive of the signal from the terminal side is attributable to channel hopping due to the occurrence of interference, as well as to exhausting of the power of the battery. Therefore, disadvantageously, judging the occurrence of interference, based on the unreceive of a signal from the terminal side, is not reliable.

SUMMARY OF THE INVENTION

In view of these problems of the prior art, the invention has been made, and it is an object of the invention to provide an asynchronous interference avoiding method and an asynchronous interference avoiding system that enable interference to be reliably avoided through a construction such that a temporary master station performs receive/judgment of a packet for the detection of interference sent from a slave station in a temporary master station interposition-type network in which a temporary master station is present.

The above object can be attained by the following features.

(1) An asynchronous interference avoiding method in a network, comprising:

a first step wherein a slave station, which can temporarily serve as a master station (a temporary master station), in a temporary master station interposition-type network receives a collision control downward packet from a first temporary master station, which temporarily serves as a master station, and judges whether or not a unique word for synchronization contained in the collision control downward packet is detected;

a second step wherein, when the slave station could not have detected the unique word in the first step as a result of interference caused by the send of the collision control downward packet from the first temporary master station and a second temporary master station as another temporary master station in different timing, the slave station counts the number of times of unique word undetection;

a third step wherein, when the number of times of receive of the collision control downward packet and the number of times of unique word undetection have exceeded or have become equal to respectively preset thresholds, the slave station judges, that asynchronous interference with the first temporary master station has taken place, stops an attempt to synchronize with the first temporary master station, temporarily functions as a third temporary master station, and performs send/receive in slot timing of the third temporary master station;

a fourth step wherein the third temporary master station searches slots in all frequencies being used for a slot, which exceeds or is equal to a preset threshold and has the highest-receive field strength, and judges whether or not the slot meeting the requirements has been detected;

a fifth step wherein, when the slot meeting the requirements has seen detected in the fourth step, the third temporary master station judges that the slot is one in interference with the first temporary master station, followed by the send of an interference detection packet through a send slot corresponding to the detected slot in a continuous manner by the number of times which exceeds or is equal to a preset threshold;

a sixth step wherein, when the interference detection packet from the third temporary master station has been sent in the same timing as the receive slot in the first temporary master station or the second temporary master station, the first temporary master station or the second temporary master station recognizes the receive of the interference detection packet and hops to a channel, which has been computed using random numbers, to avoid the interference of the collision control downward packet; and a seventh step wherein, when the first temporary master station has hopped to a new channel in the sixth step, the third temporary master station hops to a channel corresponding to the channel of the first temporary master station, is returned in its function to the slave station, and receives the collision control downward packet from the first temporary master station.

(2) The asynchronous interference avoiding method according to the item (1), wherein, in the sixth step, when the interference detection packet has been sent from the third temporary master station in timing different from that in the slot of the first temporary master station and the second temporary master station, the first temporary master station and the second temporary master station cannot detect the unique word and, when the count of the number of times of unique word undetection has exceeded or has become equal to a preset threshold within a preset time period, the first temporary master station and the second temporary master station each judge that the slot is an interfered one, followed by hopping to channels which have been computed respectively using random numbers.

(3) The asynchronous interference avoiding method according to the item (1) or (2), wherein the fifth step comprises an eighth step wherein, when the slot meeting the requirements could not have been detected in the fourth step, the third temporary master station judges whether or not the investigation of all the slots has been completed, and, when the investigation has not been completed, staggers the slot timing by half cycle, followed by return to the fourth step to again investigate the receive field strength of all the slots.

(4) The asynchronous interference avoiding method according to any one of the items (1) to (3), wherein, in the eighth step, when the investigation of all the slots has been completed, the processing is ended.

(5) The asynchronous interference avoiding method according to any one of the items (1) to (4), wherein the first step comprises a ninth step wherein, when the first temporary master station and the second temporary master station each send the collision control downward packet in a synchronized state through the same channel, the slave station detects the unique word and, since the received packet is a packet wherein the signal of the first temporary master station has been interfered with the signal of the second temporary master station, detects an error, and, as soon as the number of times of receive of the collision control downward packet and the number of times of packet error detection have exceeded or have become equal to respective preset thresholds, judges that interference with the first temporary master station has taken place, followed by the send of a channel switching request packet to the first temporary master station and the second temporary master station, and a tenth step wherein the first temporary master station and the second temporary master station receive the channel switching request packet and hop to channels which have been computed respectively using random numbers.

(6) The asynchronous interference avoiding method according to any one of the items (1) to (5), wherein the first step comprises a step wherein, when the first temporary master station and the second temporary master station send the collision control downward packet through respective separate channels, the slave station detects the unique word and, since no packet error is detected, judges that the slave station is in synchronization with the first temporary master station, and operates according to the operation of ordinary adhoc protocol.

(7) The asynchronous interference avoiding method according to any one of the items (1) to (6), wherein, in the third step, when the number of times of receive of the collision control downward packet is equal to or less than a preset threshold, or when the number of times of unique word undetection is equal to or less than a preset threshold, the step is returned to the first step.

(8) The asynchronous interference avoiding method according to any one of the items (1) to (7), wherein, in the ninth step, when the number of times of receive of the collision control downward packet is equal to or less than a preset threshold, or when the number of times of packet error detection is equal to or less than a preset threshold, the step is returned to the first step.

(9) The asynchronous interference avoiding method according to any one of the items (1) to (8), wherein the third step comprises a tenth step wherein, when the slave station temporarily functions as a third temporary master station, in all utilizable slots, the interference detection packet is continuously sent by the number of times which exceeds or is equal to a preset threshold, and when the tenth step is executed, the processing in the fourth step and the processing in the fifth step are not carried out.

(10) The asynchronous interference avoiding method according to any one of the items (1) to (9), wherein the fourth step comprises an eleventh step which comprises: upon the detection of the slot meeting the requirements, making an examination on whether or not the unique word is detected; when the unique word has not been detected, staggering the position of the slot by "1" bit before; making an examination on whether or not the unique word is detected; repeating said procedure in a range such that an electric field can be detected; and, when the unique word has been detected, sending a channel switching request packet through a send slot corresponding to said slot to allow the first temporary master station or the second temporary master station to perform channel hopping, and when the eleventh step is executed, the processing in the fifth step is not carried out.

(11) A storage medium comprising, recorded thereon, a program which can execute the asynchronous interference avoiding method according to any one of the items (1) to (10).

(12) A system for avoiding asynchronous interference in a network, comprising:

a TDMA-TDD processor for performing processing regarding TDMA-TDD;

a clock section for generating a periodic pulse signal which is sent to an RF section and the TDMA-TDD processor;

an adhoc protocol processor for processing a protocol used in an adhoc network;

a storage for the number of receive packets, for counting and storing received packets;

a storage for the number of times of unique word undetection, for storing the number of times of undetection of a unique word of a collision control downward packet sent from a temporary master station of the network;

a storage for the number of times of error detection, for storing the number of times of detection of an error in the received packet;

a hop destination channel computing section which generates random numbers to compute a channel to which next hopping is performed; and a plurality of slave stations which can temporarily perform the operation of the temporary master station, wherein when the TDMA-TDD processor has detected the unique word for synchronization of the temporary master station with the slave station and when the number of times of receive of the collision control downward packet in the storage for the number of receive packets and the number of times of detection of an error in received packet in the storage for the number of times of error detection have exceeded or have become equal to respective preset thresholds, the adhoc protocol processor judges that interference has taken place between a first temporary master station and a second temporary master station as another temporary master station among the temporary master stations which send information to the slave station, while, when the TDMA-TDD processor in the slave station cannot detect the unique word and when the number of times of receive of the collision control downward packet in the storage for the number of receive packets and the number of times of unique word undetection in the storage for the number of times of unique word undetection have exceeded or have become equal to respective preset thresholds, the adhoc protocol processor judges that interference has taken place between the first temporary master station and the slave station, the TDMA-TDD processor, based on the judgment, made by the adhoc protocol processor, such that interference has taken place between the first temporary master station and the second temporary master station, sends a channel switching request packet to the first temporary master station and the second temporary master station through the RF section for performing the send/receive of radio waves, modulation, and demodulation, while, based on the judgment, made by the adhoc protocol processor, such that interference has taken place between the first temporary master station and the slave station, the slave station temporarily functions as a third temporary master station which continuously sends, by the preset number of times, an interference detection packet through a send slot corresponding to a slot, among slots in all frequencies being used, which exceeds or is equal to a preset threshold and has the highest-receive field strength, the hop destination channel computing section, based on the channel switching request packet received by the first temporary master station and the second temporary master station, generates random numbers to compute a channel to which next hopping is performed, while, in the first temporary master station or the second temporary master station, upon judgment on the receive of the interference detection packet, or upon judgment on undetection of the unique word of the interference detection packet, or upon judgment of the interference detection packet as an error packet, in which an error has been detected, in order to avoid interference, the hop destination channel computing section generates random numbers to compute a channel to which next hopping is performed, and the third temporary master station, when the first temporary master station has performed channel hopping, hops to a channel corresponding to the channel of the first temporary master station and then returns in its function to the slave station to again receive, as the slave station, the collision control downward packet from the first temporary master station.

(13) The asynchronous interference avoiding system according to the item (12), wherein the TDMA-TDD processor comprises:

a frame processor which transfers, among packets received from the RF section, only a packet related to the adhoc protocol processor to the adhoc protocol processor;

a slot processor which extracts a receive packet of a designated slot from a receive bit string received from the RF section and embeds a send packet received from the frame processor in a designated slot followed by transfer to the RF section;

a unique word check section which detects the unique word from the receive packet and notifies the adhoc protocol processor of the result of whether or not the unique word has been detected;

an error detector which examines whether or not there is an error in the receive packet, notifies the adhoc protocol processor of the result of error detection, and, when no error has been detected, transfers the received packet to the frame processor and receives a receive packet from the unique word check section which has detected the unique word; and field strength investigation means for investigating the receive field strength, and wherein the adhoc protocol processor, every time when the notification of the undetection of the unique word from the unique word check section has been received, addes "1" to the value stored in the storage for the number of times of unique word undetection and stores the obtained value in the storage for the number of times of unique word undetection; every time when the notification of receive packet error from the error detector has been received, adds "1" to the value stored in the storage for the number of times of error detection and stores the obtained value in the storage for the number of times of error detection; and every time when the notification of unique word detection or undetection from the unique word check section has been received, adds "1" to the value stored in the storage for the number of receive packets and stores the obtained value in the storage for the number of receive packets.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in detail in conjunction with the accompanying drawings.

[First Preferred Embodiment]

Figure 1:
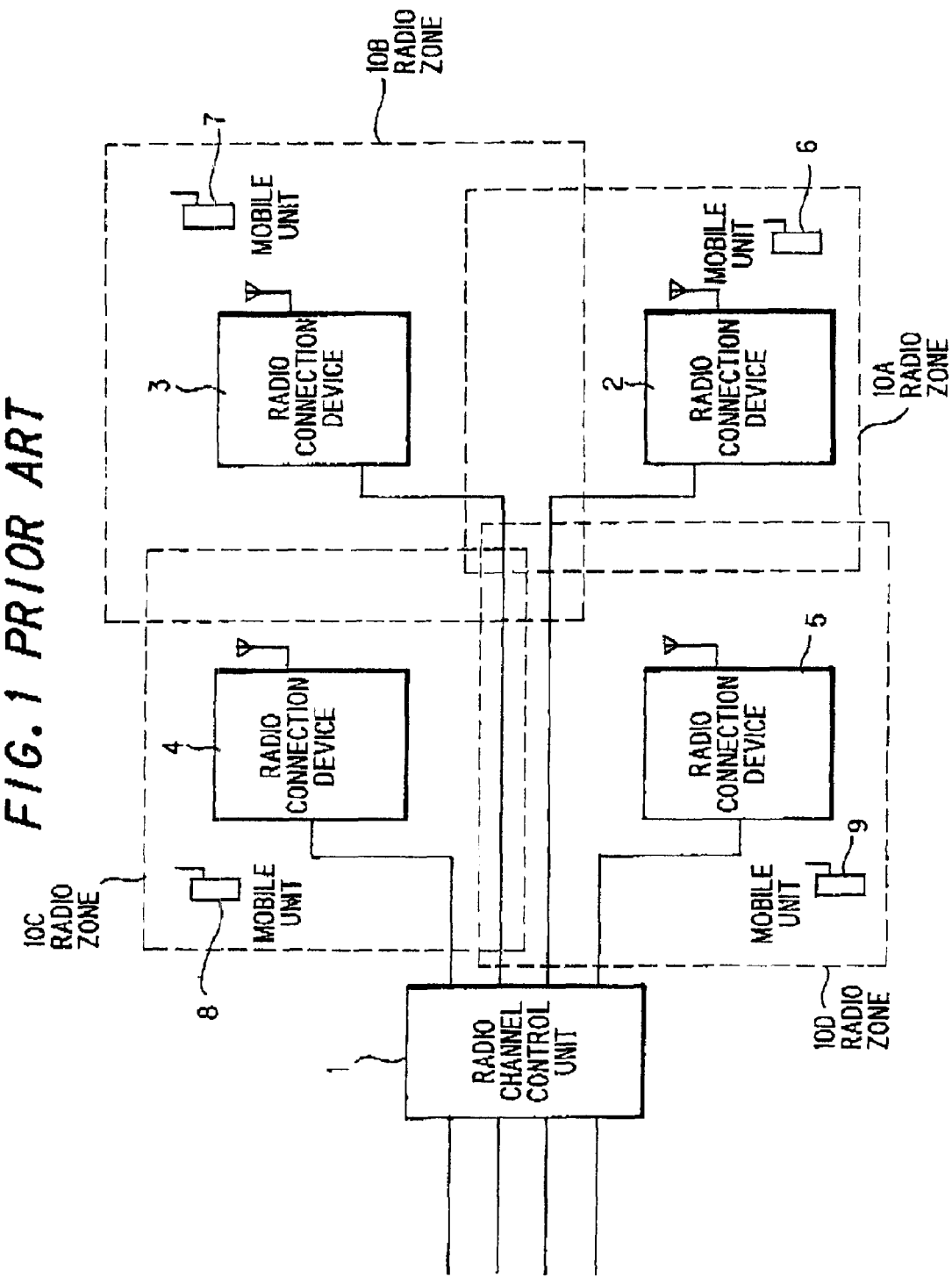
FIG. 1 is a block diagram showing an example of a conventional asynchronous interference avoiding system.
Figure 2:
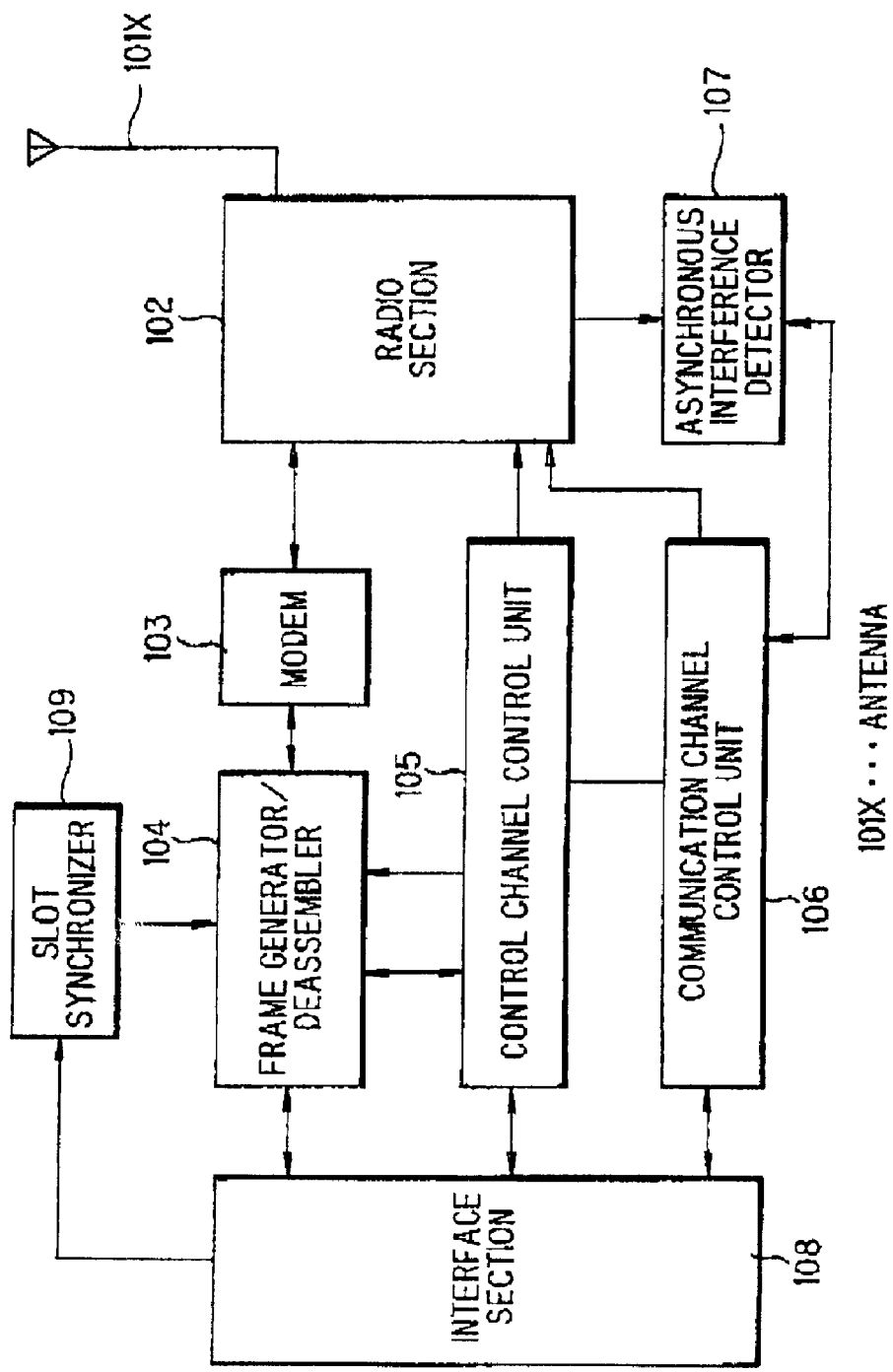
FIG. 2 is a block diagram showing the construction of a radio connection device shown in FIG. 1.
Figure 3:
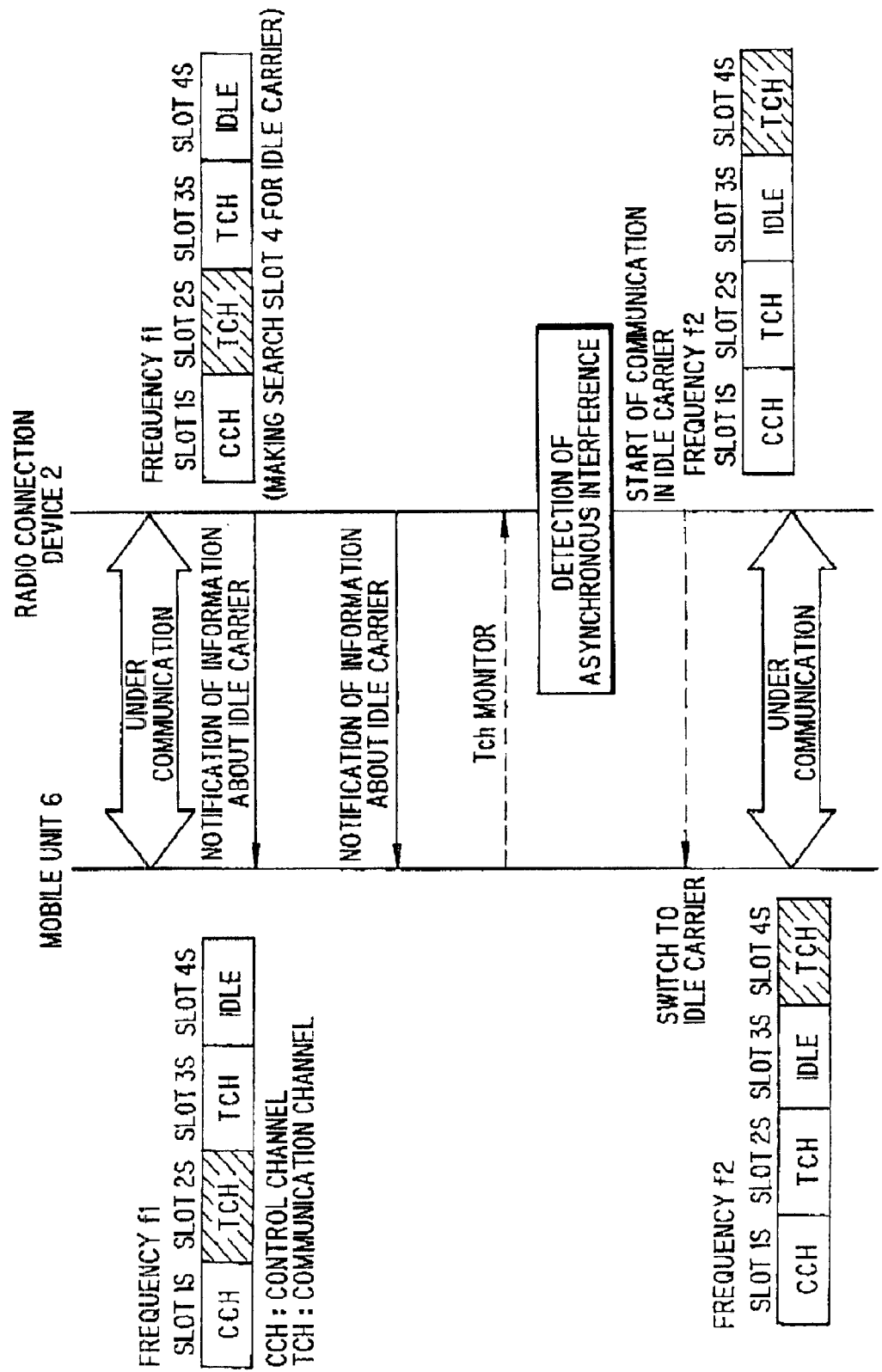
FIG. 3 is a diagram showing the flow of operation in a radio channel control unit shown in FIG. 1.
Figure 4:
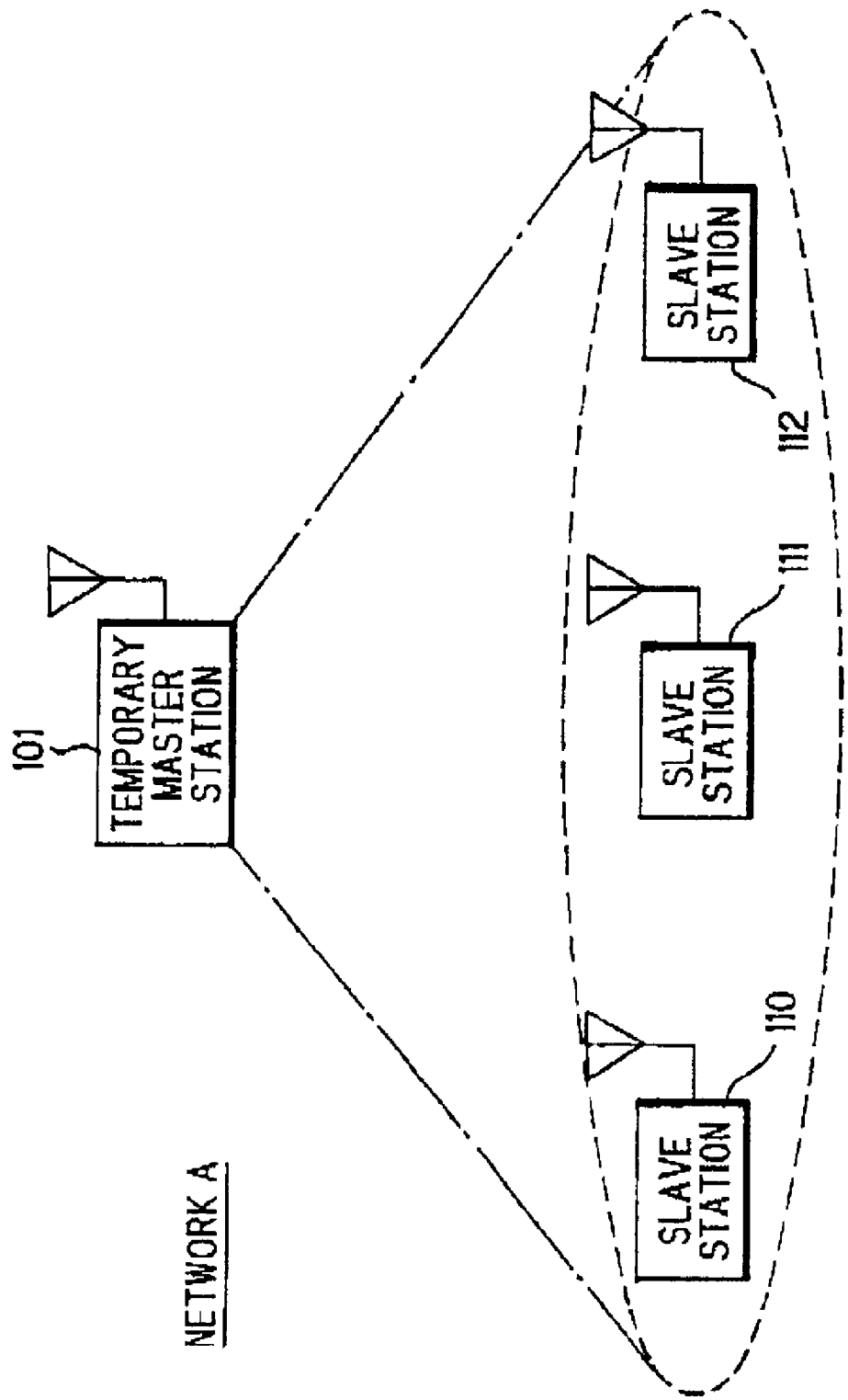
FIG. 4 is a schematic diagram showing a network for executing an asynchronous interference avoiding method according to a first preferred embodiment of the invention.

FIG. 4 is a schematic diagram showing a network A for executing an asynchronous interference avoiding method according to a first preferred embodiment of the invention. As shown in FIG. 4, the network A roughly comprises a temporary master station 101 and a plurality of slave stations 110, 111, 112 and is an adhoc network, which can be immediately constructed in situ, and is a temporary master station interposition-type network in which a temporary master station 101 is present.

The internal construction of the temporary master station 101 is the same as that of the slave stations 110, 111, 112. They are collectively called "station units." In FIG. 4, one out of the plurality of station units functions as the temporary master station 101, while the other station units function as the slave station 110, 111, 112.

Figure 5:
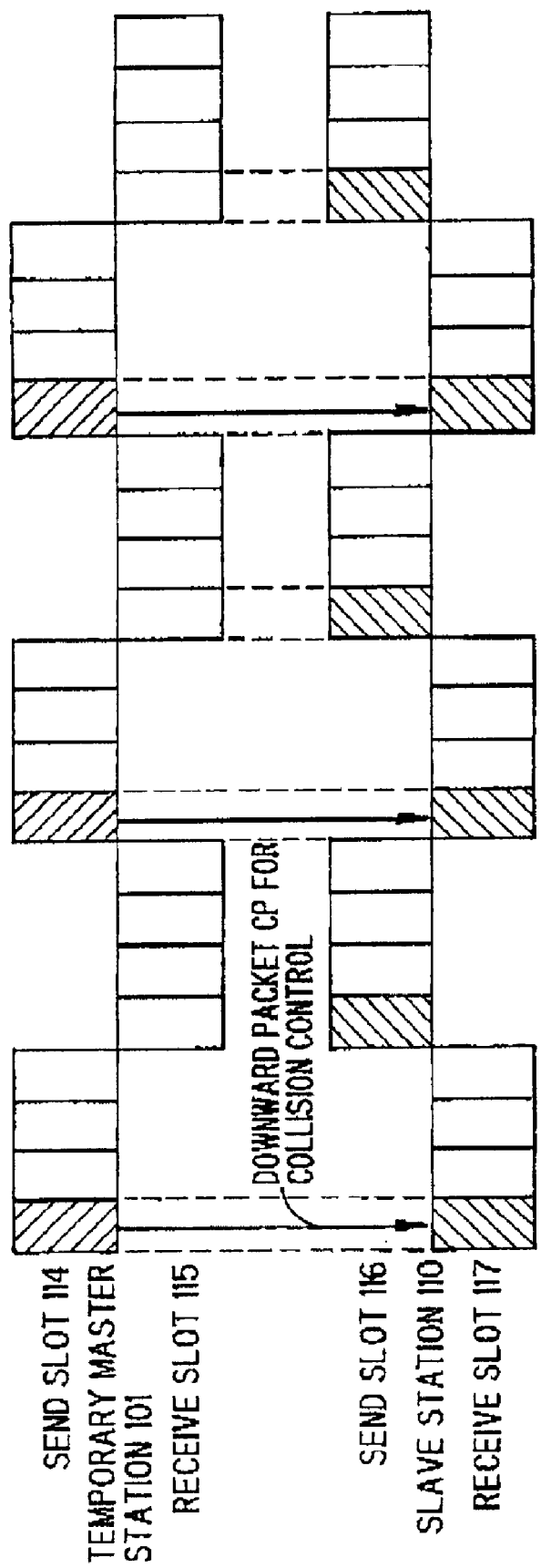
FIG. 5 is a diagram showing synchronization between a temporary master station and a slave station shown in FIG. 4.

Next, the synchronization between the temporary master station 101 and the slave station 110 (selected as a representative from the slave stations 110, 111, 112) will be explained. FIG. 5 shows the synchronization between the temporary master station 101 and the slave station 110 shown in FIG. 4.

Communication between the temporary master station 101 and the slave station 110 is carried out using TDMA-TDD (time division multiple access-time division duplex), and the number of TDMA multiplexings is "4." In the network A, one slot is used per adhoc network A. The temporary master station 101 does not synchronize with the slave station 110 and is operated in slot timing of the temporary master station 101 per se.

The slave station 110 is synchronized so that the send slot 114 of the temporary master station 101 corresponds to the receive slot 117 of the slave station 110 and, in addition, the receive slot 115 of the temporary master station 101 corresponds to the send slot 116 of the slave station 110.

In order that one slot in a receive slot 115 in the temporary master station 101 is shared by the plurality of slave stations 110, 111, 112, the temporary master station 101 should cope with a possibility that the plurality of slave stations 110, 111, 112 simultaneously send the packets.

In the network A, ICMA-PE (idle-signal casting multiple access with partial echo) is used as a method for controlling such a collision. In ICMA-PE, a downward packet for collision control (hereinafter referred to as "collision control downward packet") is always sent through a send slot 114 to the slave stations 110, 111, 112.

Figure 6:
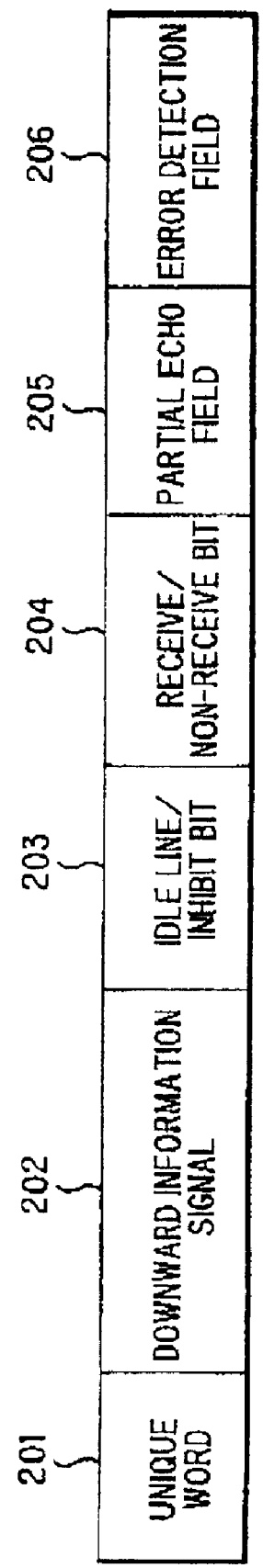
FIG. 6 is a diagram showing the construction of a downward packet for collision control shown in FIG. 5.

FIG. 6 is a diagram showing the construction of the collision control downward packet CP shown in FIG. 5. As shown in FIG. 6, the collision control downward packet CP roughly comprises a unique word 201, a downward information signal 202, a idle line/inhibit bit 203, a receive/unreceive bit 204, a partial echo field 205, and an error detection field 206.

The unique word 201 is a field for synchronization, and is a preset bit pattern. The downward information signal 202 is data which is sent from the temporary master station 101 to the slave stations 110, 111, 112. When there is data being received from a specific slave station, the idle line/inhibit bit 203 indicates "inhibit" and inhibits access from other slave stations.

The receive/non-receive bit 204 indicates "receive" in the case of proper reception of a correct signal, and indicates "non-receive" in the case of the presence of an uncorrectable error or in the case of a signal unreceived state. When "non-receive" is indicated during signal transmission, the slave stations 110, 111, 112, which are under transmission of data packet, temporarily stop to send information, and begin a resend procedure.

The partial echo field 205 indicates a part of the received data, and the slave stations 110, 111, 112 check information of the partial echo field 205 against information sent by its own station to judge whether or not the information sent by its own station is properly received. The error detection field 206 checks whether or not there is an error in the received packet.

In the network A, there are three usable frequencies, and four slots are usable for each frequency. Therefore, 12 channels in total exist. In the case of the construction of an adhoc network, the temporary master station 101 investigates whether or not each channel is idle. When a channel has been judged to be idle, the temporary master station 101 uses this idle channel to continuously send downward packet CP for collision control.

Figure 7:
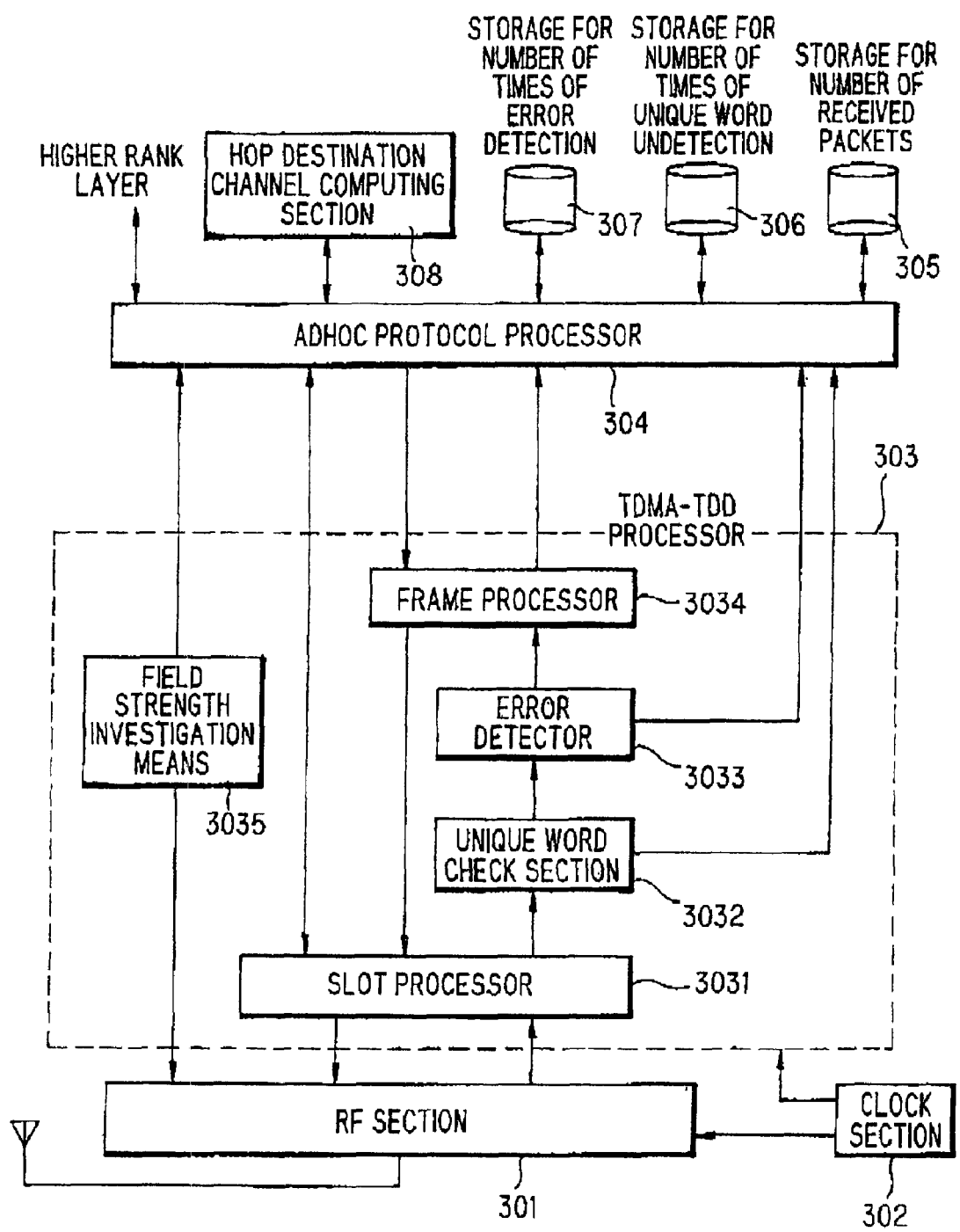
FIG. 7 is a schematic block diagram showing the construction of a slave station shown in FIG. 4.

FIG. 7 is a schematic block diagram showing the construction of the slave stations 110, 111, 112 shown in FIG. 4. As shown in FIG. 7, the station unit roughly comprises an RF section 301, a clock section 302, a TDMA-TDD processor 303, an adhoc protocol processor 304, a storage 305 for the number of received packets, a storage 306 for the number of times of unique word undetection, a storage 307 for the number of times of error detection, and a hop destination channel computing section 308.

The RF section 301 performs send/receive, modulation and demodulation of a radio wave. The clock section 302 generates a periodic pulse signal, and supplies the pulse signal to the RF section 301 and the TDMA-TDD processor 303.

The TDMA-TDD processor 303 comprises a slot processor 3031, a unique word check section 3032, an error detector 3033, a frame processor 3034, and field strength investigation means 3035, and performs processing of TDMA-TDD.

The slot processor 3031 extracts a receive packet from a designated slot in a receive bit array received from the RF section 301, and, in addition, embeds the send packet received from the frame processor 3034 in the designated slot and transfers this to the RF section 301.

The unique word check section 3032 detects the unique word 201 from the received packet. The result on whether or not the unique word 201 has been detected is notified to the adhoc protocol processor 304. When the unique word 201 has been detected, the receive packet is transferred to the error detector 3033.

The error detector 3033 investigates whether or not there is an error in the received packet. The result of error detection is notified to the adhoc protocol processor 304. When any error has not been detected, the received packet is transferred to the frame processor 3034. The frame processor 3034 transfers only a packet, associated with the adhoc protocol processor 304, among the received packets to the adhoc protocol processor 304.

The adhoc protocol processor 304 processes a protocol used in the adhoc network. The storage 305 for the number of receive packets counts and stores the received packets. The field strength investigation means 3035 investigates the receive field strength.

The storage 306 for the number of times of unique word undetection stores the number of times of undetection of the unique word 201 caused in a predetermined period of time.

The storage 307 for the number of times of error detection stores the number of times of error detected in a predetermined period of time. As soon as the adhoc protocol processor 304 receives from the unique word check section 3032 the notification of undetection of the unique word 201, the adhoc protocol processor 304 adds "1" to the number of times stored in the storage 306 for the number of times of unique word undetection, and again stores this value in the storage 306 for the number of times of unique word undetection. On the other hand, as soon as there is a notification from the error detector 3033 of the error of the receive packet, "1" is added to the number of times stored in the storage 307 for the number of times of error detection and this value is again stored in the storage 307 for the number of times of error detection. Upon the receipt of a notification from the unique word check section 3032 the detection or undetection, "1" is added to the value stored in the storage 305 for the number of receive packets and this value is again stored in the storage 305 for the number of receive packets. When this value has reached a preset predetermined value (for example, 240), the adhoc protocol processor 304 reads the value stored in the storage 306 for the number of times of unique word undetection and the storage 307 for the number of times of error detection. If these values are not less than a preset predetermined value (for example, 120), then judgment is made such that interference has taken place. This leads to the operation of avoidance of interference. Upon the completion of the judgment on whether or not the interference has taken place, "0" is set in each of the storage 305 for the number of receive packets, the storage 306 for the number of times of unique word undetection, and the storage 307 for the number of times of error detection. The hop destination channel computing section 308, when hopping to other channel is performed, computes a channel, to which hopping is next performed, using random numbers. In the case of the temporary master station 101, random numbers are generated using, as a cardinal number, ID allocated uniquely for each temporary master station 101. In the case of the slave stations 110, 111, 112, the random numbers are generated using ID of the temporary master station 101 reported from the temporary master station 101.

Figure 8:
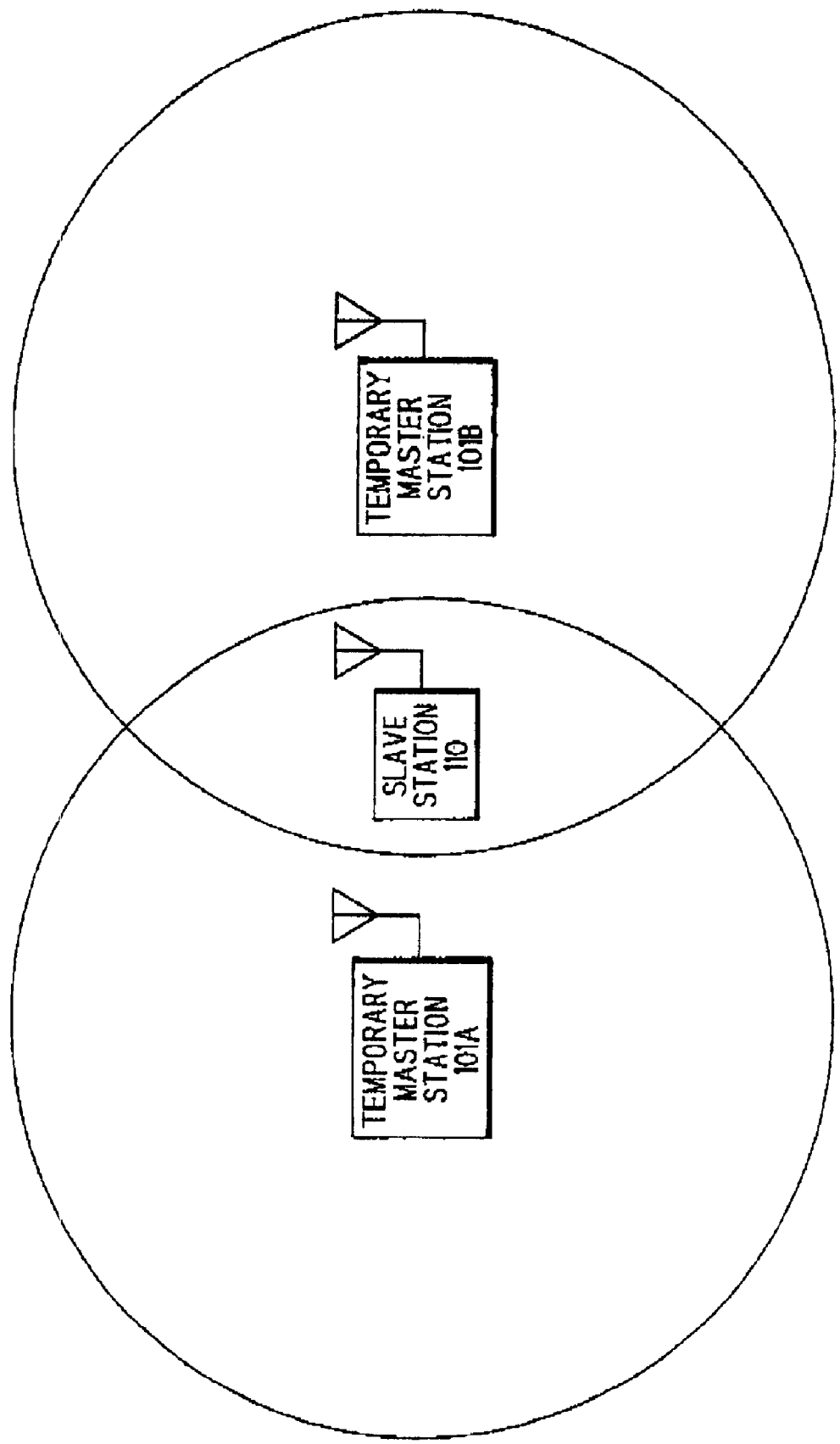
FIG. 8 is a diagram showing an embodiment of positional relationship between a first temporary master station and a second temporary master station and a slave station in the asynchronous interference avoiding system according to the first preferred embodiment of the invention.

FIG. 8 is a diagram showing an embodiment of positional relationship between a temporary master station (a first temporary master station) 101A and a temporary master station (a second temporary master station) 101B and a slave station 110 in the asynchronous interference avoiding system according to the first preferred embodiment of the invention. As shown in FIG. 8, the slave station 110 is located in a position such that can receive the collision control downward packet CP from the temporary master station 101A and the collision control downward packet CP from the temporary master station 101B.

Figure 9:
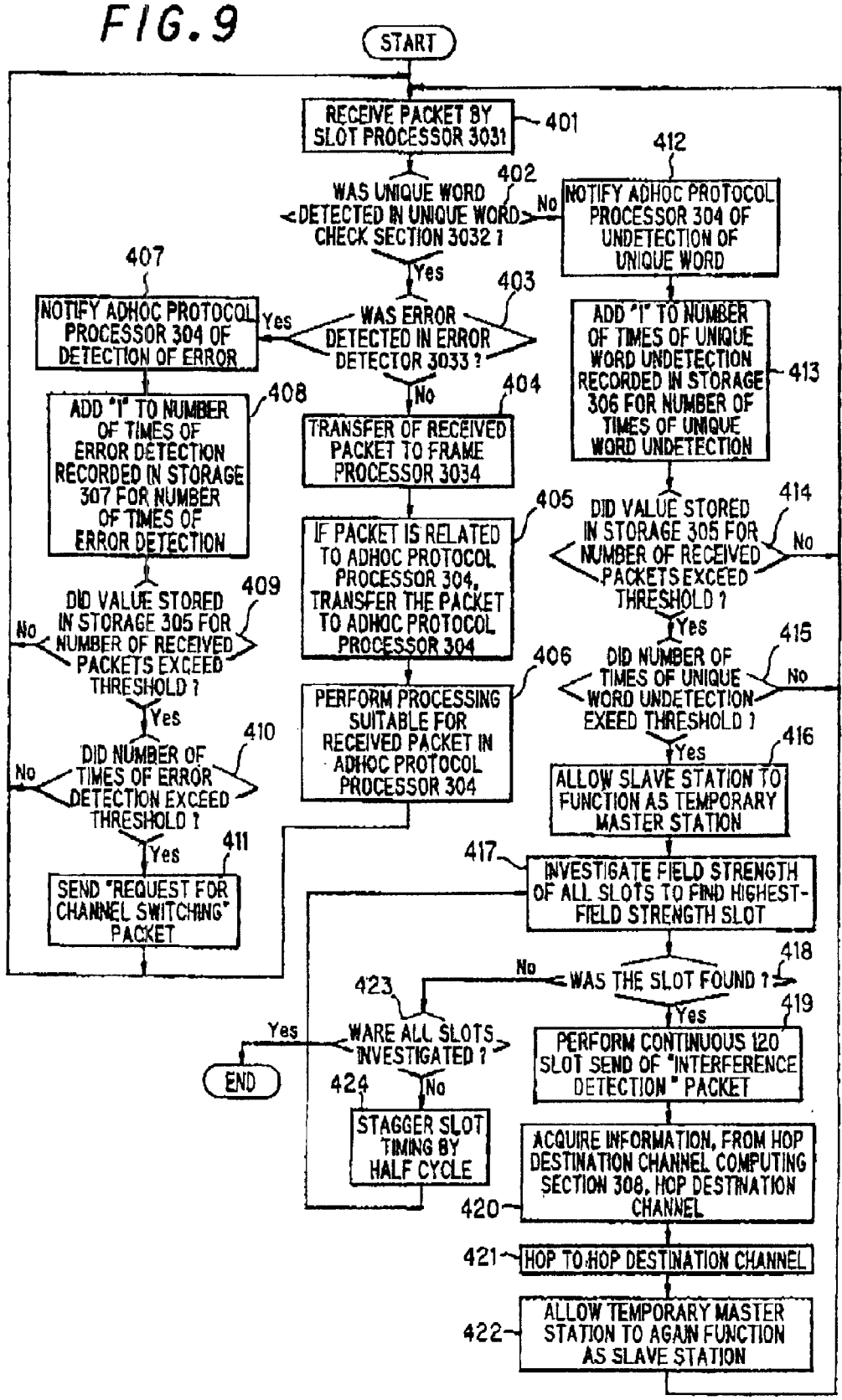
FIG. 9 is a flow chart showing the operation of the asynchronous interference avoiding system according to the first preferred embodiment of the invention.

FIG. 9 is a flow chart showing the operation of the asynchronous interference avoiding system according to the first preferred embodiment of the invention.

Next, the operation of the asynchronous interference avoiding system according to the first preferred embodiment of the invention will be explained in detail in conjunction with FIGS. 9 and 10.

Three cases, where the slave station 110 is about to receive the collision control downward packet CP from the temporary master station 101A, will be explained.

The first case is such that the temporary master station 101A and the temporary master station 101B send collision control downward packet CP to the slave station 110 through respectively different channels. The second case is such that, during communication between the temporary master station 101A and the slave station 110, the temporary master station 101B performs channel hopping to the same channel as the temporary master station 101A, and, consequently, the temporary master station 101A and the temporary master station 101B send the collision control downward packet CP through the same channel, and the send/receive of the temporary master station 101A completely synchronizes with the send/receive of the temporary master station 101B, that is, the collision control downward packet CP is sent in quite the same timing. The third case is such that the temporary master station 101A is not in synchronization with the temporary master station 101B and asynchronous interference takes place in the collision control downward packet CP to the slave station 110.

In the first case, the temporary master station 101A and the temporary master station 101B send collision control downward packet CP through respectively different channels, and, upon the receive of the collision control downward packet CP from the temporary master station 101A by the slave station 110, the unique word check section 3032 detects the unique word 201 while the error detector 3033 does not detect any error.

At the outset, the slot processor 3031 receives a packet (step 401), and sends the received packet to the unique word check section 3032.

The unique word check section 3032 examines whether or not the preset unique word 201 (shown in FIG. 5) has been detected (step 402).

In this case, since the unique word 201 is detected (in the drawing, Yes), the slave station 110 recognizes that the slave station 110 is in synchronization with the temporary master station 101A, followed by the send of this packet to the error detector 3033. The error detector 3033 judges whether or not there is an error in the received packet (step 403).

In this case, since no error is detected (in the drawing, No), the received packet is transferred to the frame processor 3034 (step 404).

The frame processor 3034 examines the type of the received packet. When this packet has been found to be one related to the adhoc protocol processor 304, the frame processor 3034 transfers this packet to the adhoc protocol processor 304 (step 405).

The adhoc protocol processor 304 examines the received packet and, thereafter, is operated according to the operation of the adhoc protocol (that is, processing according to the receive packet is carried out in the adhoc protocol processor 304) (step 406).

Figure 10:
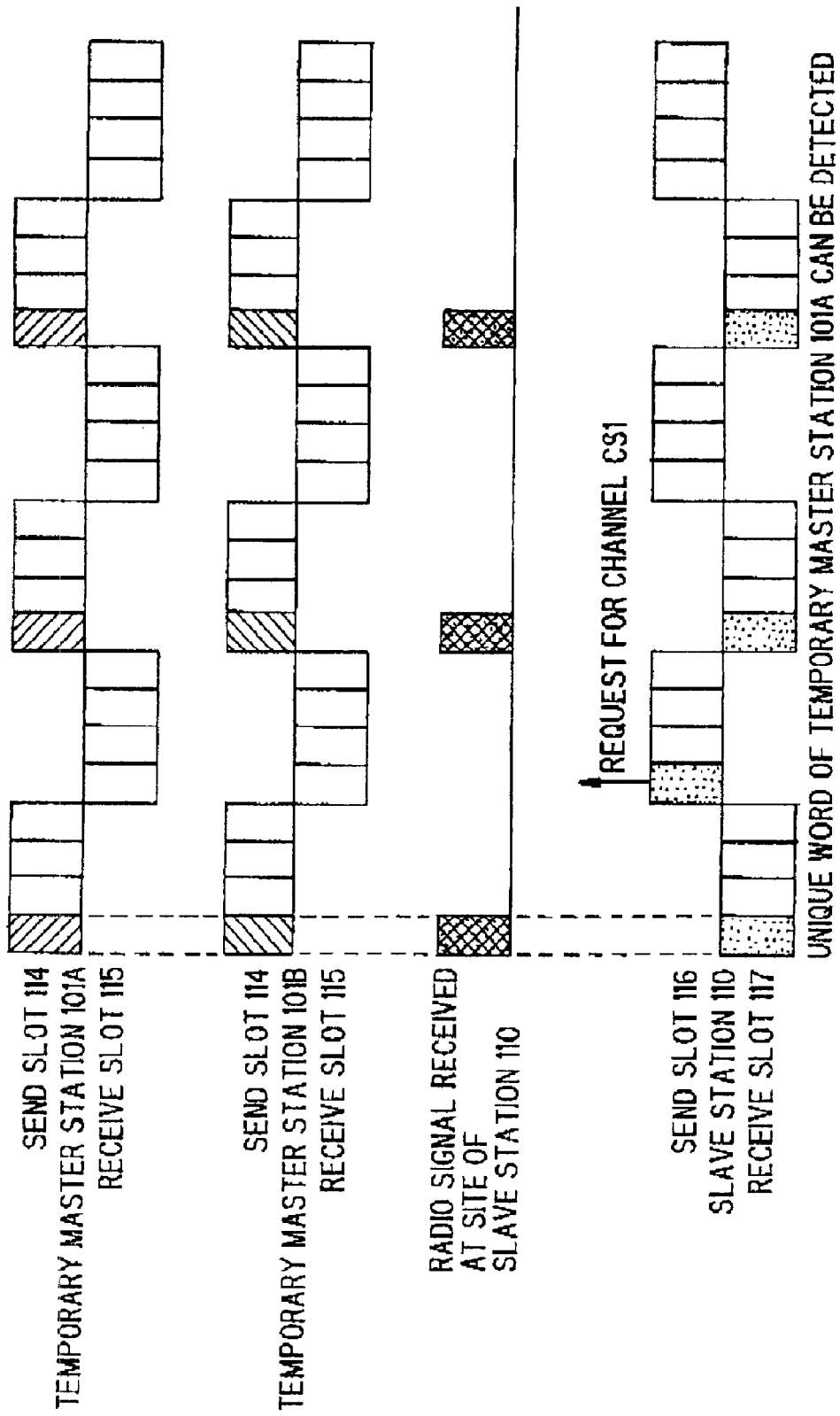
FIG. 10 is a diagram showing an embodiment of the state of synchronization shown in FIG. 9.

FIG. 10 is a diagram showing an embodiment of the state of synchronization shown in FIG. 9.

Next, the second case will be explained in conjunction with FIGS. 8 to 9. The send slot 114 and the receive slot 115 of the temporary master station 101A and the temporary master station 101B, and the send slot 116 and the receive slot 117 of the slave station 110 are shown in the drawings.

In the second case, the temporary master station 101A and the temporary master station 101B send the collision control downward packet CP through the same channel, and the send/receive of the temporary master station 101A completely synchronizes with the send/receive of the temporary master station 101B, that is, the collision control downward packet CP is sent in quite the same timing.

In this case, as soon as the slave station 110 receives a packet in the slot processor 3031 (step 401), the received packet is sent to the unique word check section 3032.

The unique word check section 3032 examines whether or not the preset unique word 201 is detected (step 402).

In this case, the collision control downward packet CP is sent from the temporary master station 101A and the temporary master station 101B in quite the same timing. Further, since the unique word 201 of the collision control downward packet CP from the temporary master station 101A is the same as the unique word 201 of the collision control downward packet CP from the temporary master station 101B, the signal in the unique word 201 portion can be received without deformation. Therefore, the unique word 201 can be detected (in the drawing, Yes), and the slave station 110 recognizes that the slave station 110 is in synchronization with the temporary master station 101A, followed by the send of the packet received in the unique word check section 3032 to the error detector 3033.

The error detector 3033 judges whether or not there is an error in the received packet (step 403). Since the received packet is a packet wherein the signal of the temporary master station 101A has been interfered with the signal of the temporary master station 101B, an error is detected in the error detector 3033 (in the drawing, Yes). The error detector 3033 notifies the adhoc protocol processor 304 of the detection of an error (step 407).

As soon as the adhoc protocol processor 304 receives the notification of the detection of an error, "1" is added to the number of times of error detection recorded in the storage 307 for the number of times of error detection (step 408) and this value is stored in the storage 307 for the number of times of error detection.

This procedure is repeated, and judgment is made on whether or not the value stored in the storage 305 for the number of receive packets has exceeded the preset threshold (for example, 240) (did the value stored in the storage 305 for the number of receive packets exceed the threshold?) (step 409).

In the step 409, when the value does not exceed the threshold (in the drawing, No), the step is returned to the step 401.

On the other hand, in the step 409, when the value has exceeded the threshold (in the drawing, Yes), judgment is made on whether or not the value in the storage 307 for the number of times of error detection has exceeded a predetermined threshold (for example, 120 times) (did the number of times of error detection exceed the threshold?) (step 410).

In the step 410, when the value does not exceed the threshold (in the drawing, No), the step is returned to the step 401.

On the other hand, in the step 410, when the value has exceeded the threshold (in the drawing, Yes), the adhoc protocol processor 304 judges that interference has taken place. In this case, the adhoc protocol processor 304 transfers a channel switching request CS1 (shown in FIG. 10) packet to the frame processor 3034. The frame processor 3034 transfers the packet from the adhoc protocol processor 304 to the slot processor 3031. The slot processor 3031 sends the channel switching request CS1 packet to the temporary master station 101A and the temporary master station 101B through the RF section 301 (step 411).

The temporary master station 101A and the temporary master station 101B, which have received the channel switching request CS1 packet, compute a channel, to which next hopping is performed, using random numbers, and each perform channel hopping.

Figure 11:
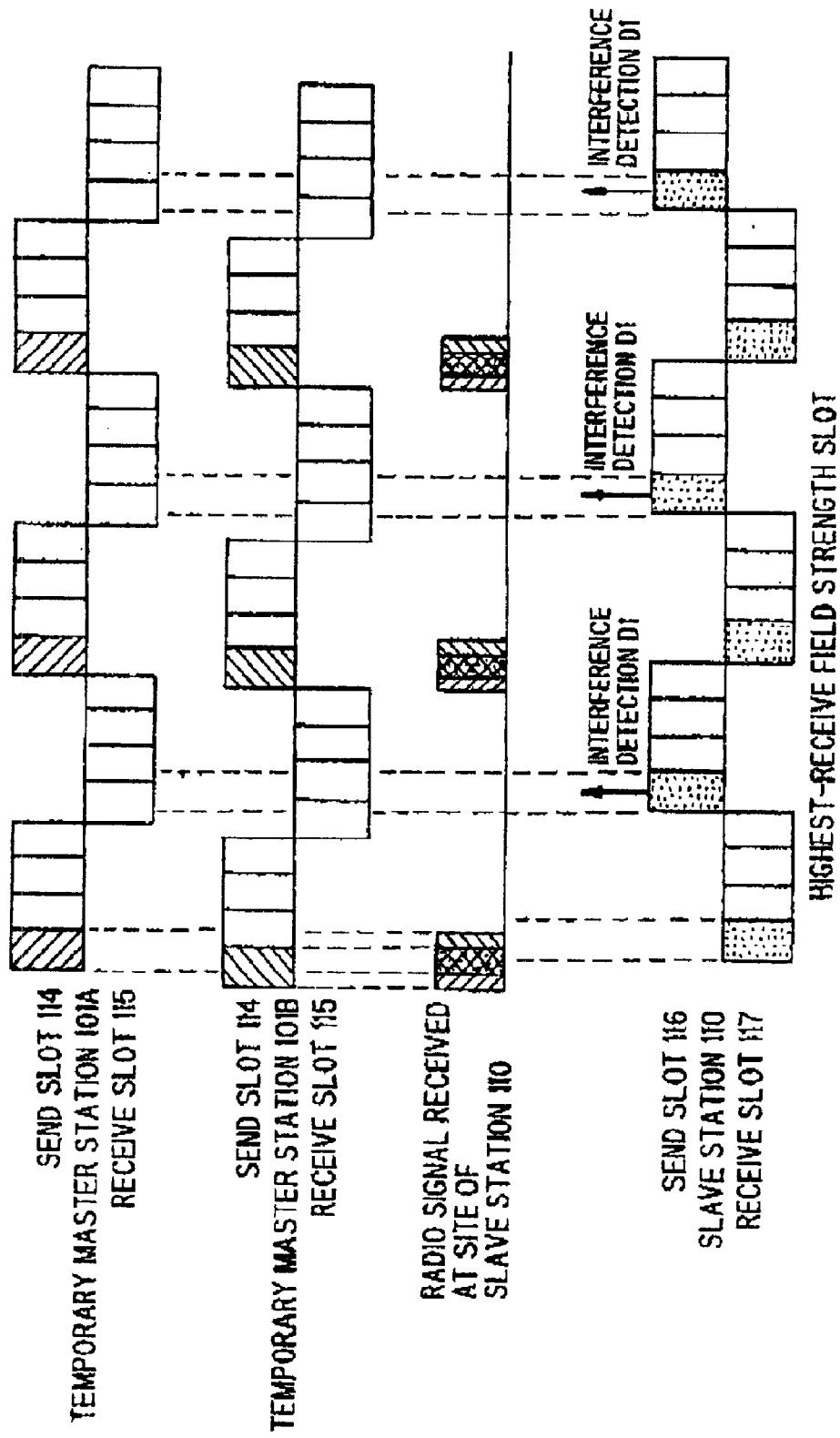
FIG. 11 is a diagram showing another embodiment of state of synchronization shown in FIG. 9.

FIG. 11 is a diagram showing another embodiment of the state of synchronization shown in FIG. 9.

The third case will be explained in conjunction with FIGS. 8, 9 and 10. In the third case, the temporary master station 101A and the temporary master station 101B send the collision control downward packet CP to the slave station 110 through the same channel, and, in addition, the temporary master station 101A is not in synchronization with the temporary master station 101B, and asynchronous interference takes place in the collision control downward packet CP.

As soon as the slave station 110 receives a packet in the slot processor 3031 (step 401), the received packet is sent to the unique word check section 3032.

The unique word check section 3032 examines whether or not the preset unique word 201 is detected (step 402).

The collision control downward packet CP from the temporary master station 101A and the collision control downward packet CP from the temporary master station 101B are not sent in the same timing with staggering and thus interfere with each other. In the slave station 110, the preset unique word 201 cannot be detected in the received collision control downward packet CP (in the drawing, No).

This makes it impossible for the slave station 110 to synchronize with the temporary master station 101A. In this case, the slave station 110 cannot also be synchronized with the temporary master station 101B. The undetection of the unique word 201 is notified to the adhoc protocol processor 304 (step 412).

As soon as the adhoc protocol processor 304 receives from the unique word check section 3032 the notification of the undetection of the unique word 201, "1" is added to the number of times of unique word undetection stored in the storage 306 for the number of times of unique word undetection, and this value is again stored in the storage 306 for the number of times of unique word undetection ("1" is added to the number of times of unique word undetection stored in the storage 306 for the number of times of unique word undetection) (step 413).

Judgment is made on whether or not the value stored in the storage 305 for the number of receive packets has exceeded the preset threshold (for example, 240) (step 414).

In the step 414, when the value does not exceed the threshold (in the drawing, No), the step is returned to the step 401.

In the step 414, when the value has exceeded the threshold (in the drawing, Yes), judgment is made on whether or not the value in the storage 306 for the number of times of unique word undetection has exceeded the preset threshold (for example, 120 times) (did the number of times of unique word undetection exceed the threshold?) (step 415).

In the step 415, when the value does not exceed the threshold (in the drawing, No), the step is returned to the step 401.

In the step 415, when the value has exceeded the threshold (in the drawing, Yes), the adhoc protocol processor 304 judges that asynchronous interference has taken place. In this case, the slave station 110 stops an attempt to synchronize with the temporary master station 101A (or the temporary master station 101B), and temporarily functions as a temporary master station (a third temporary master station, not shown) (step 416) so that send/receive can be performed in its own slot timing.

Next, in the slave station 110 which has temporarily become the third temporary master station, the field strength investigation means 3035 investigates the receive field strength in all slots for the frequency used to search for a slot wherein a field strength of not less than the preset threshold (for example, 40 dB) is detected and the highest receive field strength is provided (the field strength of all the slots is investigated to find the highest field strength slot) (step 417).

Judgment is made on whether or not the contemplated slot has been found in the step 417 (step 418).

When the contemplated slot has been detected in the step 418 (in the drawing, Yes), the third temporary master station judges that the detected slot is a slot wherein the collision control downward packet CP from the temporary master station 101A and the collision control downward packet CP from the temporary master station 101B interfere with each other. In this case, in order to recognize interference state, an interference detection D1 packet is continuously sent by the number of times which is equal to or more than the preset threshold (for example, 120 times) to the send slot 116 corresponding to this slot (continuous 120 slot send of "interference detection" packet is performed) (step 419).

When this interference detection D1 packet could have been sent in quite the same timing as the receive slot 115 of the temporary master station 101A or the temporary master station 101B, the temporary master station 101A or the temporary master station 101B can recognize the interference detection D1 packet. Therefore, the temporary master station 101A or the temporary master station 101B, which has recognized the interference detection D1 packet, acquires the hop destination channel, which the hop destination channel computing section 308 has computed (step 420), and hops to the acquired channel (step 421) to avoid the interference of the collision control downward packet CP.

On the other hand, in the step 419, when the interference detection D1 packet has been sent in timing, which is different from the timing in each receive slot 115 in the temporary master station 101A and the temporary master station 101B, the unique word 201 is undetected in the temporary master station 101A and the temporary master station 101B. When the temporary master station 101A or the temporary master station 101B has received the unique word 201 undetected packet by the number of times which is equal to or more than the preset threshold (for example, 120 times) within a preset time period, the temporary master station 101A or the temporary master station 101B recognizes that the slot is an interfered slot. The temporary master station 101A or the temporary master station 101B, which has recognized the interference, acquires the hop destination channel which the hop destination channel computing section 308 has computed (step 420), followed by hopping to the acquired channel.

Likewise, the slave station 110, which temporarily serves as the third temporary master station, also acquires a hop destination channel which the hop destination channel computing section 308 has computed by generating random numbers using ID of the temporary master station 101A reported from the temporary master station 101A, followed by hopping to the acquired channel (step 421).

The third temporary master station again becomes the slave station 110 (i.e., becomes a slave station) (step 422), and again attempts to receive the collision control downward packet CP sent from the temporary master station 101A.

In the step 418, when the contemplated slot could not have been detected (in the drawing, No), judgment is made on whether or not the investigation of all the slots has been completed (step 423). If the judgment is such that the investigation has not been completed, then the slot timing is staggered by half cycle (step 424), followed by return to the step 417 to again investigate the receive field strength of all the slots.

On the other hand, in the step 423, when the judgment is such that the investigation has been completed (in the drawing, Yes), the processing is ended.

Thus, asynchronous interference avoiding is achieved between the temporary master station 101A and the slave station 110.

By virtue of the above construction, the asynchronous interference avoiding method and the asynchronous interference avoiding system according to this preferred embodiment have the following effects.

Upon the detection of asynchronous interference, a search for a slot having the highest-receive field strength is carried out, and an interference detection packet is sent through a send slot corresponding to this slot. When the temporary master station 101A or the temporary master station 101B suffering from asynchronous interference recognizes the interference detection packet, or when the temporary master station 101A or the temporary master station 101B recognizes interference through interference caused by the send of the interference detection packet, channel hopping is executed by the temporary master station 101A or the temporary master station 101B. Therefore, asynchronous interference avoiding can be realized by a reliable method. When this asynchronous interference avoiding method is utilized in a monitor in the slave station 110, receive radio waves in the network A provided with a large number of slave stations can be closely controlled.

(Second Preferred Embodiment)

Figure 12:
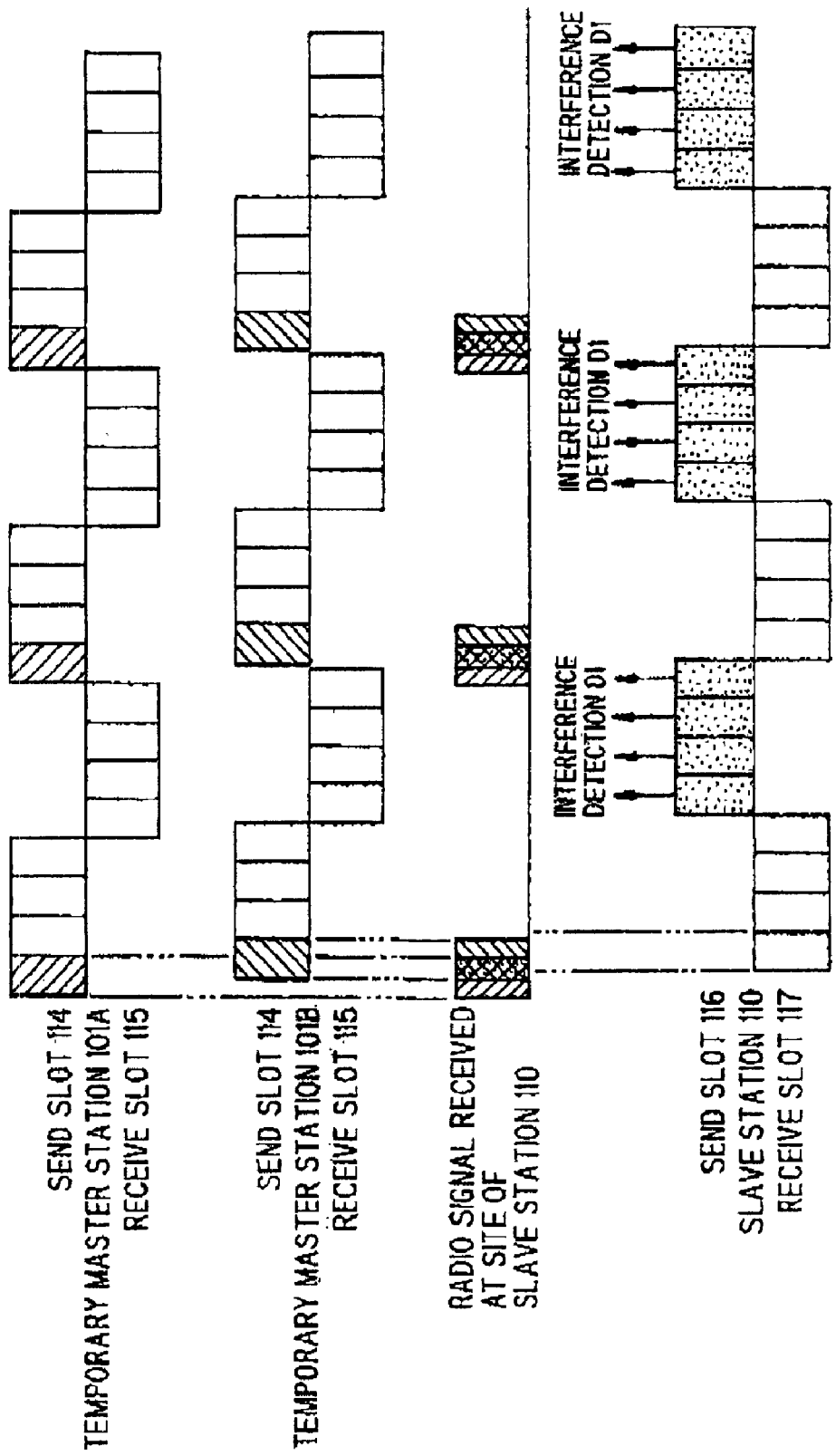
FIG. 12 is a diagram showing an embodiment of the state of synchronization in an asynchronous interference avoiding system according to a second preferred embodiment of the invention.

FIG. 12 is a diagram showing an embodiment of the state of synchronization in an asynchronous interference avoiding system according to a second preferred embodiment of the invention. The construction of the asynchronous interference avoiding system according to the second preferred embodiment of the invention is the same as that of the first preferred embodiment of the invention, and, thus, the explanation thereof will be omitted.

In the operation in and after the step 417 shown in FIG. 9, a search for the highest-receive field strength slot is carried out, followed by the send of an interference detection D1 packet through a send slot corresponding to this slot. On the other hand, as shown in FIG. 12, the interference detection D1 packet is sent through all the slots. This can eliminate the need to search for the highest-receive field strength slot. The explanation of other reference characters will be omitted.

By virtue of this operation, as compared with the first preferred embodiment, channel hopping can be more reliably carried out by the temporary master station.

(Third Preferred Embodiment)

Figure 13:
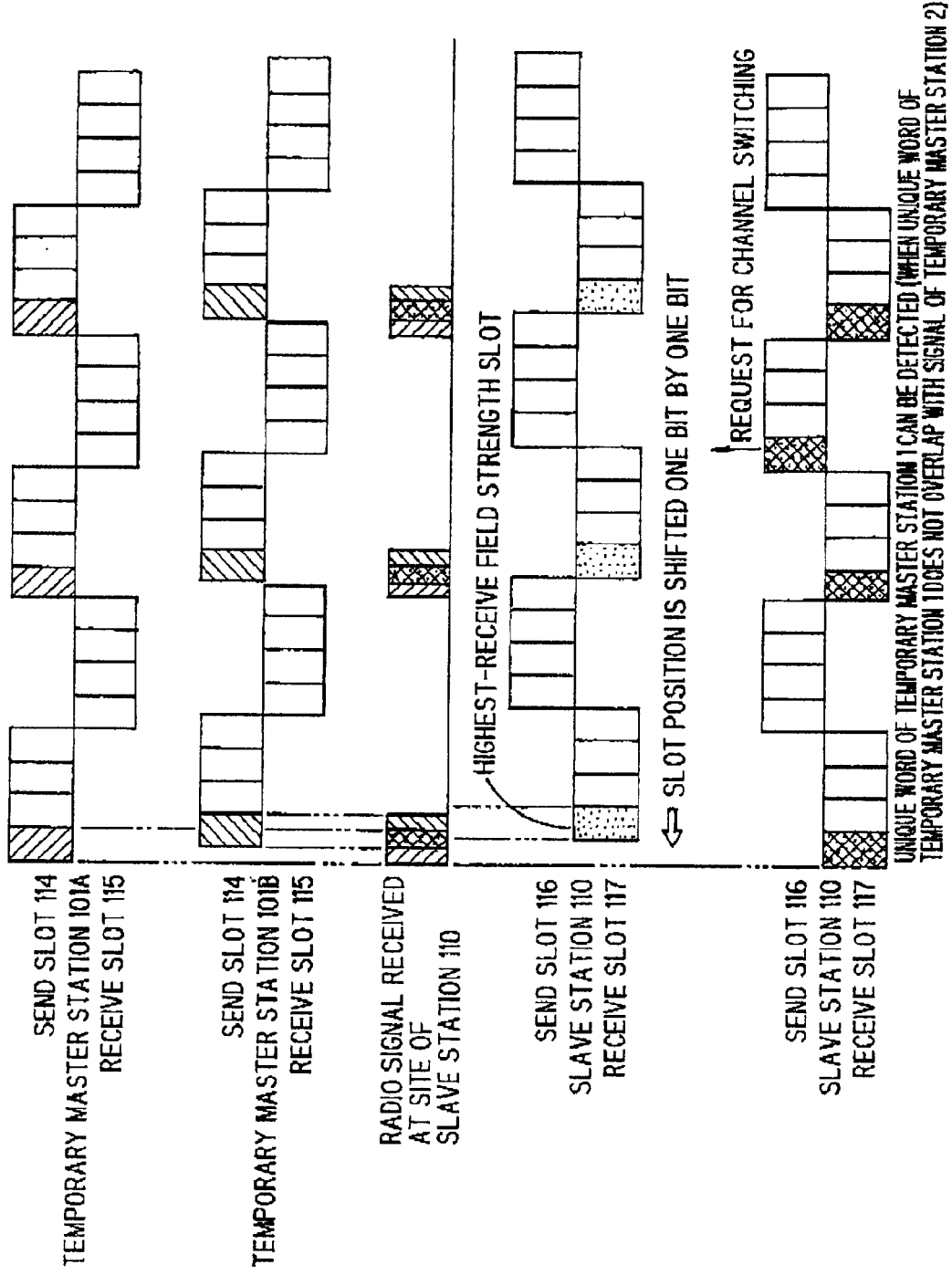
FIG. 13 is a diagram showing an embodiment of the state of synchronization in an asynchronous interference avoiding system according to a third preferred embodiment of the invention.

FIG. 13 is a diagram showing an embodiment of the state of synchronization in an asynchronous interference avoiding system according to a third preferred embodiment of the invention. The construction of the asynchronous interference avoiding system according to the third preferred embodiment of the invention is the same as that of the first preferred embodiment of the invention, and, thus, the explanation thereof will be omitted.

In the step 418 shown in FIG. 9, when the highest-receive field strength slot was obtained, an examination is made on whether or not the unique word 201 is detected (not shown).

If the unique word has not been detected, as shown in FIG. 13, the position of the slot is staggered by "1" bit before and an examination is again made on whether or not the unique word 201 is detected. This operation is repeated in a region, where an electric field can be detected, to examine whether or not the unique word 201 is obtained. If the unique word 201 is obtained, then synchronization with the temporary master station 101A, which sends this unique word 201, becomes possible. Therefore, the send of a channel switching request CS1 through the send slot 116 corresponding to the receive slot 117 can realize channel hopping by the temporary master station 101A without intentional interference and thus can avoid interference.

The invention is not limited to the above preferred embodiments, and can also be applied to other suitable techniques regarding asynchronous interference avoiding methods and asynchronous interference avoiding systems.

The number, position, shape and the like of the constituent members are not limited to those described in the preferred embodiments and may be those suitable for practicing the invention.

Like parts are identified with the same reference numerals throughout all of the drawings.

By virtue of the above construction, the invention has the following effect.

In a communication system using TDMA-TDD comprising master stations and slave stations, asynchronous interference can be avoided by a reliable method. Specifically, when asynchronous interference has been detected, a search for the highest-receive field strength slot is carried out, an interference detection packet is sent through a send slot corresponding to the found highest-receive field strength slot, and when the temporary master station suffering from asynchronous interference recognizes the interference detection packet, or when the temporary master station recognizes interference through interference caused by the send of the interference detection packet, channel hopping is executed by the temporary master station.

The invention has been described in detail with particular reference to preferred embodiments, but it will be understood that variations and modifications can be effected within the scope of the invention as set forth in the appended claims.

What is claimed is:

1. An asynchronous interference avoiding method in a network comprising:

a first step wherein a slave station, which can temporarily serve as a master station (a temporary master station), in the slave station interposition-type network receives a collision control downward packet from a first temporary master station, which temporarily serves as a master station, and judges whether or not a unique word for synchronization contained in the collision control downward packet is detected;

a second step wherein, when the slave station could not have detected the unique word in the first step as a result of interference caused by the send of the collision control downward packet from the first temporary master station and a second temporary master station as another temporary master station in different timing, the slave station counts the number of times of unique word undetection;

a third step wherein, when the number of times of receive of the collision control downward packet and the number of times of unique word undetection have exceeded or have become equal to respectively preset thresholds, the slave station judges, that asynchronous interference with the first temporary master station has taken place, stops an attempt to synchronize with the first temporary master station, temporarily functions as a third temporary master station, and performs send/receive in slot timing of the third temporary master station;

a fourth step wherein the third temporary master station searches slots in all frequencies being used for a slot, which exceeds or is equal to a preset threshold and has the highest-receive field strength, and judges whether or not the slot meeting the requirements has been detected;

a fifth step wherein, when the slot meeting the requirements has been detected in the fourth step, the third temporary master station judges that the slot is one in interference with the first temporary master station, followed by the send of an interference detection packet through a send slot corresponding to the detected slot in a continuous manner by the number of times which exceeds or is equal to a preset threshold;

a sixth step wherein, when the interference detection packet from the third temporary master station has been sent in the same timing as the receive slot in the first temporary master station or the second temporary master station, the first temporary master station or the second temporary master station recognizes the receive of the interference detection packet and hops to a channel, which has been computed using random numbers, to avoid the interference of the collision control downward packet; and a seventh step wherein, when the first temporary master station has hopped to a new channel in the sixth step, the third temporary master station hops to a channel corresponding to the channel of the first temporary master station, is returned in its function to the slave station, and receives the collision control downward packet from the first temporary master station.

2. The asynchronous interference avoiding method according to claim 1, wherein, in the sixth step, when the interference detection packet has been sent from the third temporary master station in timing different from that in the slot of the first temporary master station and the second temporary master station, the first temporary master station and the second temporary master station cannot detect the unique word and, when the count of the number of times of unique word undetection has exceeded or has become equal to a preset threshold within a preset time period, the first temporary master station and the second temporary master station each judge that the slot is an interfered one, followed by hopping to channels which have been computed respectively using random numbers.

3. The asynchronous interference avoiding method according to claim 1, wherein the fifth step comprises an eighth step wherein, when the slot meeting the requirements could not have been detected in the fourth step, the third temporary master station judges whether or not the investigation of all the slots has been completed, and, when the investigation has not been completed, staggers the slot timing by half cycle, followed by return to the fourth step to again investigate the receive field strength of all the slots.

4. The asynchronous interference avoiding method according to claim 1, wherein, in the eighth step, when the investigation of all the slots has been completed, the processing is ended.

5. The asynchronous interference avoiding method according to claim 1, wherein the first step comprises a ninth step wherein, when the first temporary master station and the second temporary master station each send the collision control downward packet in a synchronized state through the same channel, the slave station detects the unique word and, since the received packet is a packet wherein the signal of the first temporary master station has been interfered with the signal of the second temporary master station, detects an error, and, as soon as the number of times of receive of the collision control downward packet and the number of times of packet error detection have exceeded or have become equal to respective preset thresholds, judges that interference with the first temporary master station has taken place, followed by the send of a channel switching request packet to the first temporary master station and the second temporary master station, and a tenth step wherein the first temporary master station and the second temporary master station receive the channel switching request packet and hop to channels which have been computed respectively using random numbers.

6. The asynchronous interference avoiding method according to claim 1, wherein the first step comprises a step wherein, when the first temporary master station and the second temporary master station send the collision control downward packet through respective separate channels, the slave station detects the unique word and, since no packet error is detected, judges that the slave station is in synchronization with the first temporary master station, and operates according to the operation of ordinary adhoc protocol.

7. The asynchronous interference avoiding method according to claim 1, wherein, in the third step, when the number of times of receive of the collision control downward packet is equal to or less than a preset threshold, or when the number of times of unique word undetection is equal to or less than a preset threshold, the step is returned to the first step.

8. The asynchronous interference avoiding method according to claim 1, wherein, in the ninth step, when the number of times of receive of the collision control downward packet is equal to or less than a preset threshold, or when the number of times of packet error detection is equal to or less than a preset threshold, the step is returned to the first step.

9. The asynchronous interference avoiding method according to claim 1, wherein the third step comprises a tenth step wherein, when the slave station temporarily functions as a third temporary master station, in all utilizable slots, the interference detection packet is continuously sent by the number of times which exceeds or is equal to a preset threshold, and when the tenth step is executed, the processing in the fourth step and the processing in the fifth step are not carried out.

10. The asynchronous interference avoiding method according to claim 1, wherein the fourth step comprises an eleventh step which comprises: upon the detection of the slot meeting the requirements, making an examination on whether or not the unique word is detected; when the unique word has not been detected, staggering the position of the slot by "1" bit before; making an examination on whether or not the unique word is detected; repeating said procedure in a range such that an electric field can be detected; and, when the unique word has been detected, sending a channel switching request packet through a send slot corresponding to said slot to allow the first temporary master station or the second temporary master station to perform channel hopping, and when the eleventh step is executed, the processing in the fifth step is not carried out.

11. A storage medium comprising, recorded thereon, a program which can execute the asynchronous interference avoiding method according to claim 1.

12. A system for avoiding asynchronous interference in a network, comprising:

a TDMA-TDD processor for performing processing regarding TDMA-TDD;

a clock section for generating a periodic pulse signal which is sent to an RF section and the TDMA-TDD processor;

an adhoc protocol processor for processing a protocol used in an adhoc network;

a storage for the number of receive packets, for counting and storing received packets;

a storage for the number of times of unique word undetection, for storing the number of times of undetection of a unique word of a collision control downward packet sent from a temporary master station of the network;

a storage for the number of times of error detection, for storing the number of times of detection of an error in the received packet;

a hop destination channel computing section which generates random numbers to compute a channel to which next hopping is performed; and a plurality of slave stations which can temporarily perform the operation of the temporary master station, wherein when the TDMA-TDD processor has detected the unique word for synchronization of the temporary master station with the slave station, and, when the number of times of receive of the collision control downward packet in the storage for the number of receive packets and the number of times of detection of an error in received packet in the storage for the number of times of error detection have exceeded or have become equal to respective preset thresholds, the adhoc protocol processor judges that interference has taken place between a first temporary master station and a second temporary master station as another temporary master station among the temporary master stations which send information to the slave station, while, when the TDMA-TDD processor in the slave station cannot detect the unique word and when the number of times of receive of the collision control downward packet in the storage for the number of receive packets and the number of times of unique word undetection in the storage for the number of times of unique word undetection have exceeded or have become equal to respective preset thresholds, the adhoc protocol processor judges that interference has taken place between the first temporary master station and the slave station, the TDMA-TDD processor, based on the judgment, made by the adhoc protocol processor, such that interference has taken place between the first temporary master station and the second temporary master station, sends a channel switching request packet to the first temporary master station and the second temporary master station through the RF section for performing the send/receive of radio waves, modulation, and demodulation, while, based on the judgment, made by the adhoc protocol processor, such that interference has taken place between the first temporary master station and the slave station, the slave station temporarily functions as a third temporary master station which continuously sends, by the preset number of times, an interference detection packet through a send slot corresponding to a slot, among slots in all frequencies being used, which exceeds or is equal to a preset threshold and has the highest-receive field strength, the hop destination channel computing section, based on the channel switching request packet received by the first temporary master station and the second temporary master station, generates random numbers to compute a channel to which next hopping is performed, while, in the first temporary master station or the second temporary master station, upon judgment on the receive of the interference detection packet, or upon judgment on undetection of the unique word of the interference detection packet, or upon judgment of the interference detection packet as an error packet, in which an error has been detected, in order to avoid interference, the hop destination channel computing section generates random numbers to compute a channel to which next hopping is performed, and the third temporary master station, when the first temporary master station has performed channel hopping, hops to a channel corresponding to the channel of the first temporary master station and then returns in its function to the slave station to again receive, as the slave station, the collision control downward packet from the first temporary master station.

13. The asynchronous interference avoiding system according to claim 12, wherein the TDMA-TDD processor comprises:

a frame processor which transfers, among packets received from the RF section, only a packet related to the adhoc protocol processor to the adhoc protocol processor;

a slot processor which extracts a receive packet of a designated slot from a receive bit string received from the RF section and embeds a send packet received from the frame processor in a designated slot followed by transfer to the RF section;

a unique word check section which detects the unique word from the receive packet and notifies the adhoc protocol processor of the result of whether or not the unique word has been detected;

an error detector which examines whether or not there is an error in the receive packet, notifies the adhoc protocol processor of the result of error detection, and, when no error has been detected, transfers the received packet to the frame processor and receives a receive packet from the unique word check section which has detected the unique word; and field strength investigation means for investigating the receive field strength, and wherein the adhoc protocol processor, every time when the notification of the undetection of the unique word from the unique word check section has been received, addes "1" to the value stored in the storage for the number of times of unique word undetection and stores the obtained value in the storage for the number of times of unique word undetection; every time when the notification of receive packet error from the error detector has been received, adds "1" to the value stored in the storage for the number of times of error detection and stores the obtained value in the storage for the number of times of error detection; and every time when the notification of unique word detection or undetection from the unique word check section has been received, adds "1" to the value stored in the storage for the number of receive packets and stores the obtained value in the storage for the number of receive packets.

14. The asynchronous interference avoiding method according to claim 2, wherein the fifth step comprises an eighth step wherein, when the slot meeting the requirements could not have been detected in the fourth step, the third temporary master station judges whether or not the investigation of all the slots has been completed, and, when the investigation has not been completed, staggers the slot timing by half cycle, followed by return to the fourth step to again investigate the receive field strength of all the slots.

15. The asynchronous interference avoiding method according to claim 3, wherein, in the eighth step, when the investigation of all the slots has been completed, the processing is ended.

16. The asynchronous interference avoiding method according to claim 2, wherein the first step comprises a ninth step wherein, when the first temporary master station and the second temporary master station each send the collision control downward packet in a synchronized state through the same channel, the slave station detects the unique word and, since the received packet is a packet wherein the signal of the first temporary master station has been interfered with the signal of the second temporary master station, detects an error, and, as soon as the number of times of receive of the collision control downward packet and the number of times of packet error detection have exceeded or have become equal to respective preset thresholds, judges that interference with the first temporary master station has taken place, followed by the send of a channel switching request packet to the first temporary master station and the second temporary master station, and a tenth step wherein the first temporary master station and the second temporary master station receive the channel switching request packet and hop to channels which have been computed respectively using random numbers.

17. The asynchronous interference avoiding method according to claim 3, wherein the first step comprises a ninth step wherein, when the first temporary master station and the second temporary master station each send the collision control downward packet in a synchronized state through the same channel, the slave station detects the unique word and, since the received packet is a packet wherein the signal of the first temporary master station has been interfered with the signal of the second temporary master station, detects an error, and, as soon as the number of times of receive of the collision control downward packet and the number of times of packet error detection have exceeded or have become equal to respective preset thresholds, judges that interference with the first temporary master station has taken place, followed by the send of a channel switching request packet to the first temporary master station and the second temporary master station, and a tenth step wherein the first temporary master station and the second temporary master station receive the channel switching request packet and hop to channels which have been computed respectively using random numbers.

18. The asynchronous interference avoiding method according to claim 4, wherein the first step comprises a ninth step wherein, when the first temporary master station and the second temporary master station each send the collision control downward packet in a synchronized state through the same channel, the slave station detects the unique word and, since the received packet is a packet wherein the signal of the first temporary master station has been interfered with the signal of the second temporary master station, detects an error, and, as soon as the number of times of receive of the collision control downward packet and the number of times of packet error detection have exceeded or have become equal to respective preset thresholds, judges that interference with the first temporary master station has taken place, followed by the send of a channel switching request packet to the first temporary master station and the second temporary master station, and a tenth step wherein the first temporary master station and the second temporary master station receive the channel switching request packet and hop to channels which have been computed respectively using random numbers.

19. The asynchronous interference avoiding method according to claim 2, wherein the first step comprises a step wherein, when the first temporary master station and the second temporary master station send the collision control downward packet through respective separate channels, the slave station detects the unique word and, since no packet error is detected, judges that the slave station is in synchronization with the first temporary master station, and operates according to the operation of ordinary adhoc protocol.

20. The asynchronous interference avoiding method according to claim 3, wherein the first step comprises a step wherein, when the first temporary master station and the second temporary master station send the collision control downward packet through respective separate channels, the slave station detects the unique word and, since no packet error is detected, judges that the slave station is in synchronization with the first temporary master station, and operates according to the operation of ordinary adhoc protocol.

* * * * *